(12) United States Patent
Lahr et al.

(10) Patent No.: US 12,189,233 B2
(45) Date of Patent: Jan. 7, 2025

(54) DISPLAY SYSTEM AND METHOD FOR OPERATING A DISPLAY SYSTEM

(71) Applicant: Continental Automotive GmbH, Hannover (DE)

(72) Inventors: Torsten Lahr, Zornheim (DE); Ulrich Kabatek, Babenhausen (DE); Markus Weber, Mainz (DE); Steffen Wildner, Dieburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 17/769,453

(22) PCT Filed: Oct. 12, 2020

(86) PCT No.: PCT/EP2020/078569
§ 371 (c)(1),
(2) Date: Apr. 15, 2022

(87) PCT Pub. No.: WO2021/074061
PCT Pub. Date: Apr. 22, 2021

(65) Prior Publication Data
US 2024/0126118 A1    Apr. 18, 2024

(30) Foreign Application Priority Data

Oct. 15, 2019    (DE) ............... 10 2019 215 869.2

(51) Int. Cl.
*G02F 1/00*    (2006.01)
*G02F 1/1333*    (2006.01)
(Continued)

(52) U.S. Cl.
CPC .. *G02F 1/133603* (2013.01); *G02F 1/133388* (2021.01); *G09G 3/32* (2013.01);
(Continued)

(58) Field of Classification Search
CPC .......... G09G 3/32; G09G 3/3426; G09G 3/36; G02F 1/133603; G02F 1/133388
See application file for complete search history.

(56) References Cited

U.S. PATENT DOCUMENTS

2009/0168401 A1* 7/2009 Kwon ............... G02F 1/133611
362/97.1
2009/0256492 A1 10/2009 Lee et al.
(Continued)

FOREIGN PATENT DOCUMENTS

CN    201607597 U    10/2010
CN    201964266 U    9/2011
(Continued)

OTHER PUBLICATIONS

Office Action dated Jul. 13, 2023 from corresponding Korean patent application No. 10-2022-7009397.
(Continued)

*Primary Examiner* — Gerald J Sufleta, II

(57) ABSTRACT

A display system comprises a display, configured for displaying data, wherein the display comprises an inactive display edge not configured for displaying, and an active display inner surface configured for displaying. The display system further comprises a backlighting module having luminous units, wherein the backlighting module is arranged directly or indirectly at a rear side of the display, such that the light emitted by the luminous units forms a backlight for the display. The backlighting module comprises a backlighting edge corresponding to the display edge and comprises a backlighting inner surface corresponding to the display inner surface. The display system further comprises and a control system for driving the luminous units. A vehicle comprising a display system and a method for operating a display system is also provided.

15 Claims, 3 Drawing Sheets

(51) Int. Cl.
*G02F 1/13357* (2006.01)
*G09G 3/32* (2016.01)
*G09G 3/34* (2006.01)
*G09G 3/36* (2006.01)
*B60K 35/22* (2024.01)

(52) U.S. Cl.
CPC ............. *G09G 3/3426* (2013.01); *G09G 3/36* (2013.01); *B60K 35/22* (2024.01); *B60K 2360/349* (2024.01); *G09G 2300/0469* (2013.01)

(56) References Cited

U.S. PATENT DOCUMENTS

| | | |
|---|---|---|
| 2012/0218315 A1 | 8/2012 | Hsiao et al. |
| 2015/0138755 A1 | 5/2015 | Bastani et al. |
| 2018/0040676 A1 | 2/2018 | Hack et al. |
| 2020/0192422 A1* | 6/2020 | Hendren ............... G02B 6/0088 |
| 2020/0320939 A1* | 10/2020 | Ma ....................... G09G 3/3406 |

FOREIGN PATENT DOCUMENTS

| | | |
|---|---|---|
| CN | 101839423 B | 1/2013 |
| DE | 102007045560 A1 | 4/2009 |
| DE | 202011000857 U1 | 7/2011 |
| DE | 102017213757 A1 | 2/2019 |
| EP | 2434197 A1 | 3/2012 |
| KR | 20090108461 A | 10/2009 |
| KR | 101469476 B1 | 12/2014 |
| KR | 20190086207 A | 7/2019 |

OTHER PUBLICATIONS

Notice of Allowance dated Nov. 29, 2023 from corresponding Korean patent application No. 10-2022-7009397.
German Search Report dated Apr. 15, 2020 for the counterpart German Application No. 10 2019 215 869.2.
The International Search Report and the Written Opinion of the International Searching Authority mailed on Feb. 9, 2021 for the counterpart PCT Application No. PCT/EP2020/078569.
International Preliminary Report on Patentability mailed on Apr. 19, 2022 for the counterpart PCT Application No. PCT/EP2020/078569.

* cited by examiner

DISPLAY SYSTEM AND METHOD FOR OPERATING A DISPLAY SYSTEM

CROSS REFERENCE TO RELATED APPLICATIONS

This U.S. patent application claims the benefit of PCT patent application No. PCT/EP2020/078569, filed Oct. 12, 2020, which claims the benefit of German patent application No. 10 2019 215 869.2, filed Oct. 15, 2019, both of which are hereby incorporated by reference.

TECHNICAL FIELD

The disclosure relates to a display system comprising a display configured for displaying data, wherein the display comprises an inactive display edge not configured for displaying, and an active display inner surface configured for displaying, and wherein the display system furthermore comprises a backlighting module having luminous units, wherein the backlighting module is arranged directly or indirectly at a rear side of the display, such that the light emitted by the luminous units forms a backlight for the display, and wherein the backlighting module comprises a backlighting edge corresponding to the display edge and comprises an active backlighting inner surface corresponding to the active display inner surface, and wherein the display system furthermore comprises a control system for driving the luminous units. The disclosure furthermore relates to a vehicle comprising such a display system, and to a method for operating a display system.

BACKGROUND

In the case of a liquid crystal display, a so-called LCD, its function is based on the fact that liquid crystals influence the polarisation direction of light where a specific amount of electrical voltage is applied. LCDs consist of picture elements, so-called pixels, which can change their transparency independently of one another. For this purpose, the alignment of the liquid crystals is controlled by an electrical voltage in each pixel. The transmissivity for polarized light changes as a result.

Polarized light is generated by means of polarization filters which are arranged on the display and which filter the incident light. If a display is intended to be able to represent arbitrary contents, the elements are arranged in a uniform grid (a matrix). Backlighting modules are used to generate the incident light.

In recent years, instead of conventional cold cathode fluorescent lights (CCFL), LEDs (light emitting diodes) have been used as backlighting modules of an LCD liquid crystal display.

These light emitting diodes distributed on the entire area of the backlighting module bring about the illumination of the display. Moreover, light emitting diodes can be driven separately, such that individual portions of the illuminated area which are intended to represent a deep black can be separately dimmed (local dimming) or switched off.

DE 10 2007 045 560 A1 discloses a display device comprising a transilluminable display and a backlighting unit for the transilluminable display, wherein the backlighting unit comprises a light guide and light sources arranged laterally on the light guide, wherein a plurality of groups of light sources are interconnected such that the light sources of a group are driven jointly and such that the groups of light sources are driven depending on an image content of the transilluminable display.

DE 20 2011 000 857 U1 discloses a display backlighting arrangement for increasing the performance in respect of color saturation, brightness and white balance, said arrangement being accommodated in a backlighting module in order to make a light source available to an LCD module, comprising a plurality of luminous zones connected to one another, wherein the luminous zone comprises a color light source unit and a brightness light source unit, comprising a control device, which is electrically connected to the color light source unit and the brightness light source unit in order to switch the color light source unit and the brightness light source unit on or off or to adjust them.

SUMMARY

The disclosure is based on the object of specifying a display system having an improved display representation.

Further objects are to specify a method for operating such a display system and to specify a vehicle comprising such a display system.

A display system comprising a display configured for displaying data, wherein the display comprises an inactive display edge not configured for displaying, and an active display inner surface configured for displaying is provided. The display system further comprises a backlighting module having luminous units, wherein the backlighting module is arranged directly or indirectly at a rear side of the display, such that the light emitted by the luminous units forms a backlight for the display, and wherein the backlighting module comprises a backlighting edge corresponding to the display edge and comprises an active backlighting inner surface corresponding to the active display inner surface. The display system further comprises a control system for driving the luminous units, and wherein a transition edge region extending from the backlighting edge over a portion of the backlighting inner surface is provided, wherein a first number of individually driveable luminous units are arranged in the transition edge region. Furthermore, the backlighting inner surface without the transition edge region comprises a second number of individually driveable luminous units, and wherein the first number is higher than the second number. The control system is configured to drive the luminous units arranged in the transition edge region individually or with said luminous units interconnected in first clusters, and to drive the luminous units comprised by the backlighting inner surface without the transition edge region with said luminous units interconnected in second clusters, and wherein the number of interconnected luminous units in the first cluster is lower than the number of interconnected luminous units in the second cluster.

It has been recognized according to the disclosure that in the case of a conventional backlighting module, the LEDs are arranged equidistantly. As a result, the resolution of the backlighting is the same over the entire area of the backlighting module. It has furthermore been recognized that increasing the resolution by increasing the number of LEDs used over the entire backlighting module would increase the complexity and above all the costs.

This problem is now solved by means of the disclosure. According to the disclosure, a first number of individually driveable luminous units are arranged only in the transition edge region extending from the backlighting edge over a portion of the backlighting inner surface, while a second number, which is lower than the first number, of individually driveable luminous units are arranged at the backlighting inner surface without the transition edge region.

In this case, the second number corresponds to the original number of a conventional backlighting module.

Furthermore, additionally or alternatively, while the luminous units at the backlighting inner surface without the transition edge region are interconnected in larger clusters (groups), the luminous units in the transition edge region are driven with these luminous units interconnected in smaller groups or individually. The resolution of the backlighting is thus increased by a reduction of the simultaneously driven luminous units. The local dimming algorithms are adapted according to the new modified density.

The higher resolution in the transition edge region enables very local backlighting of details in the display representation. As a result, adjacent dark regions are illuminated less and the local contrast is thereby increased for the entire display. This has the effect that the active backlighting inner surface and thus the active display inner surface differ less from the black print of the display edge, for example.

An increased local resolution of the backlighting is achieved by means of the display system according to the invention. In this case, the transition between an active display inner surface of the display and the black print of the cover glass, that is to say the inactive display edge, is optimized such that the driver is not disturbed thereby. In other words, in particular the background brightness of the black image regions of the display edge and in the display itself is minimized. Overexposure of the adjoining regions of black image regions and the resultant disturbing brightness of the black image regions are avoided. The black image regions provided at the display inner surface and the black display edge thus remain black. The contrast of the entire display surface is thus increased.

In one embodiment, the display is configured as a liquid crystal (LCD) display. LCD displays preferably comprise two glass panes lying one above the other and sealed along the edges, wherein the liquid crystals are accommodated in the space thus delimited between the two glass sheets. The alignment of the liquid crystals is controlled by electrical voltage in each pixel to be displayed.

With further preference, the luminous units in the transition edge region are arranged in a matrix-shaped fashion. In this case, in a matrix-shaped fashion means that the luminous units are arranged in particular in a manner distributed uniformly in rows and columns. It is thereby possible to bring about a uniform increase in the contrast of the backlighting in the transition edge region.

In a configuration, the luminous units in the backlighting inner surface without the transition edge region are arranged in a matrix-shaped fashion. In this case, in a matrix-shaped fashion means that the luminous units are arranged in particular in a manner distributed uniformly in rows and columns. This brings about a uniform backlighting of the backlighting inner surface without the transition edge region.

No luminous units or, in comparison with the transition edge region and the backlighting inner surface without the transition edge region, a reduced number of luminous units are arranged in the backlighting edge. As a result, the costs may be reduced and the contrast may be increased.

In another configuration, the display inner surface comprises non-visible regions, wherein no luminous units are arranged in the backlighting inner surface corresponding to said regions.

Alternatively or optionally supplementarily, the display inner surface comprises non-visible regions, wherein a reduced number of luminous units are arranged in the backlighting inner surface corresponding to said regions. This means that in regions which are not visible, luminous units are omitted and/or reduced and system costs are thus saved. Non-visible regions are for example regions on the active display inner surface which are covered by mechanical elements, for example, or on which operating buttons are arranged. In said backlighting inner surfaces corresponding to said regions, the luminous units can be reduced or omitted in order thus to save system costs.

With further preference, the luminous units are configured as light emitting diodes (LEDs). The latter are cost-effective. With further preference, the light emitting diodes are designed to be individually dimmable. A further increase in contrast can be achieved as a result.

Furthermore, the object is achieved by means of a vehicle comprising a display system as described above. In particular, the vehicle is an automobile. Furthermore, in particular, the display system is provided in an instrument.

Furthermore, the object is achieved by means of a method for operating a display system comprising the following steps: providing a display configured for displaying data, wherein the display comprises an inactive display edge not configured for displaying, and an active display inner surface configured for displaying; providing a backlighting module having luminous units, wherein the backlighting module is arranged directly or indirectly at a rear side of the display, such that the light emitted by the luminous units forms a backlight for the display, and wherein the backlighting module comprises a backlighting edge corresponding to the display edge and comprises a backlighting inner surface corresponding to the display inner surface; providing a control system for driving the luminous units; providing a transition edge region extending from the backlighting edge over a portion of the backlighting inner surface; operating a first number of individually driveable luminous units arranged in the transition edge region; operating a second number of individually driveable luminous units arranged in the backlighting inner surface without the transition edge region, wherein the first number is higher than the second number; and/or driving luminous units individually or with said luminous units interconnected in first clusters, which are arranged in the transition edge region, and interconnected in second clusters, which are arranged in the backlighting inner surface without the transition edge region, wherein the number of interconnected luminous units in the first cluster is lower than the number of interconnected luminous units in the second cluster.

The method is suitable for being carried out on a display system according to the disclosure. The advantages described further above with regard to the display system according to the disclosure are analogously applicable to the method according to the invention as well.

Preferably, no luminous units or, in comparison with the transition edge region and the backlighting inner surface without the transition edge region, a reduced number of luminous units are arranged in the backlighting edge.

BRIEF DESCRIPTION OF THE DRAWINGS

Further properties and advantages of the present disclosure will become apparent from the following detailed description with reference to the accompanying figures, in which, schematically.

DETAILED DESCRIPTION

Although the disclosure has been more specifically illustrated and described in detail by means of the embodiments, the disclosure is not restricted by the examples disclosed.

Figure 1:
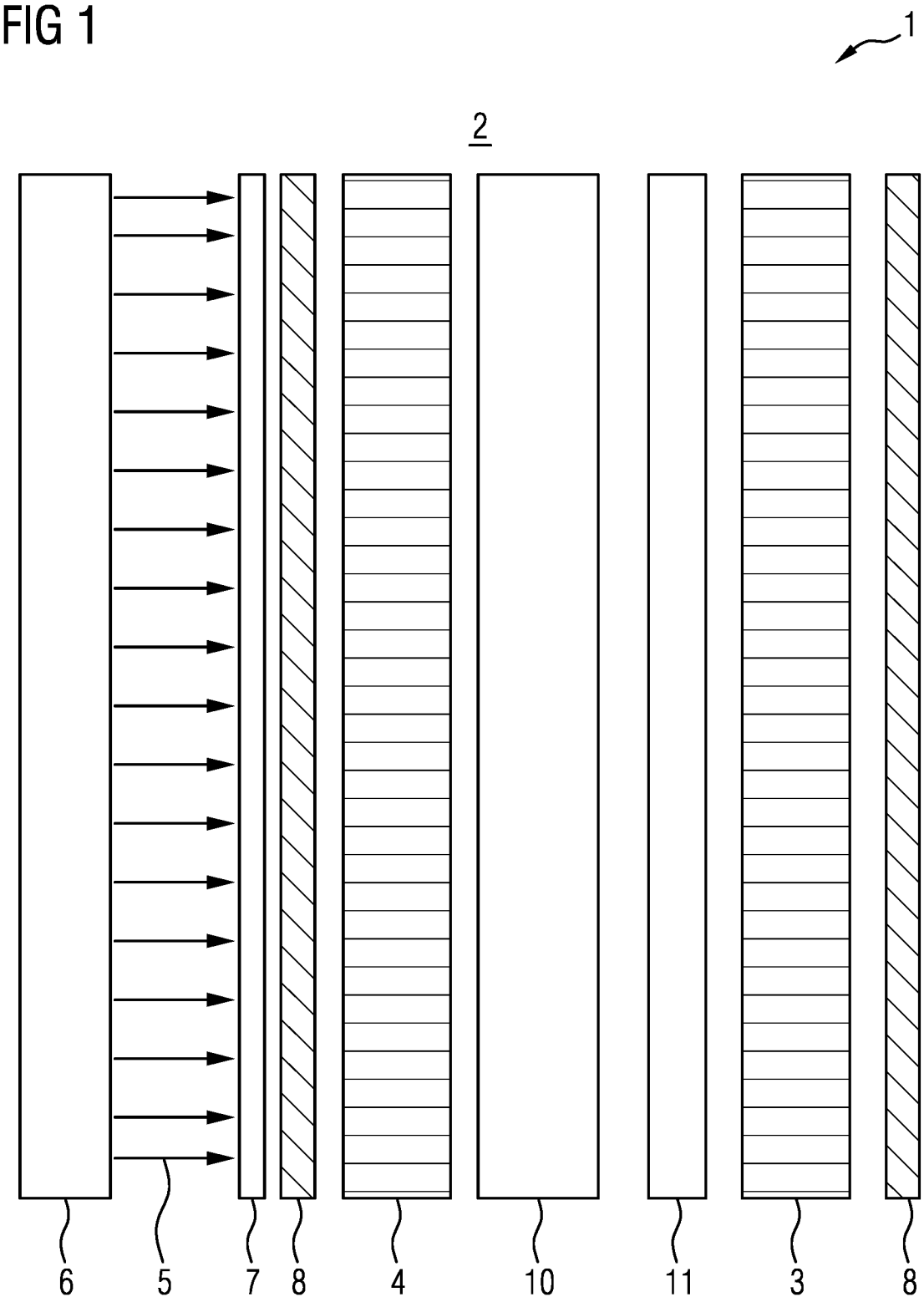
FIG. 1 shows a first exemplary embodiment of a display system.

FIG. 1 shows a first embodiment of a display system 1 according to the disclosure. Said display system comprises a liquid crystal display 2 configured for displaying an image. Since, in contrast to plasma or OLED displays, the liquid crystal display 2 is not self-luminous, the required brightness in the color elements/pixels has to be generated by a backlighting module 6 having LEDs 5.

The liquid crystal display 2 comprises a front glass 3 and a rear glass 4. The front glass 3 and the rear glass 4 serve as a protective layer and as a carrier for the LC (liquid) cells 10, which will be described in even more detail below.

The liquid crystal display 2 comprises a diffusor 7. The light generated by the backlighting module 6 has a spatial structure. The LEDs 5 positioned at the diffusor 7 behind the liquid crystal display 2 have a radiation power dependent on the aperture angle. Said spatial structure is uniformly distributed by means of the diffusor 7. Furthermore, the liquid crystal display 2 also comprises polarization filters 8 for polarizing the light that emerges from the LEDs 5.

Furthermore, the display system 1 also comprises a control unit, not shown, which can drive the LEDs 5 individually. In addition, the LEDs 5 are configured to be dimmable, which can likewise be regulated by the control unit, not shown. The control unit can be for example the control device of the vehicle.

Furthermore, the liquid crystal display 2 comprises LC (liquid crystal) cells 10 comprising liquid crystal molecules. In the latter, the linearly polarized light is rotated such that the desired brightness is attained in a color element. For this purpose, the alignment of the liquid crystal molecules is influenced by a voltage being applied between two electrodes.

Moreover, the liquid crystal display 2 also comprises a color filter 11. The perceived color of a pixel is determined by means of the color filter.

Furthermore, the liquid crystal display 2 also comprises a display edge. For this purpose, for example, the front glass 3 can be printed with a black edge as the display edge.

The liquid crystal display 2 is thus divided into an inactive display edge, that is to say that no image is displayed here, and into an active display inner surface, in which the image to be represented is displayed.

Further inactive surfaces can likewise be present, which can arise for example as a result of operating elements arranged on the liquid crystal display 2.

The backlighting module 6 comprises a backlighting edge 12 (FIG. 2) corresponding to the display edge, and a backlighting inner surface 13 (FIG. 2) corresponding to the display inner surface.

Figure 2:
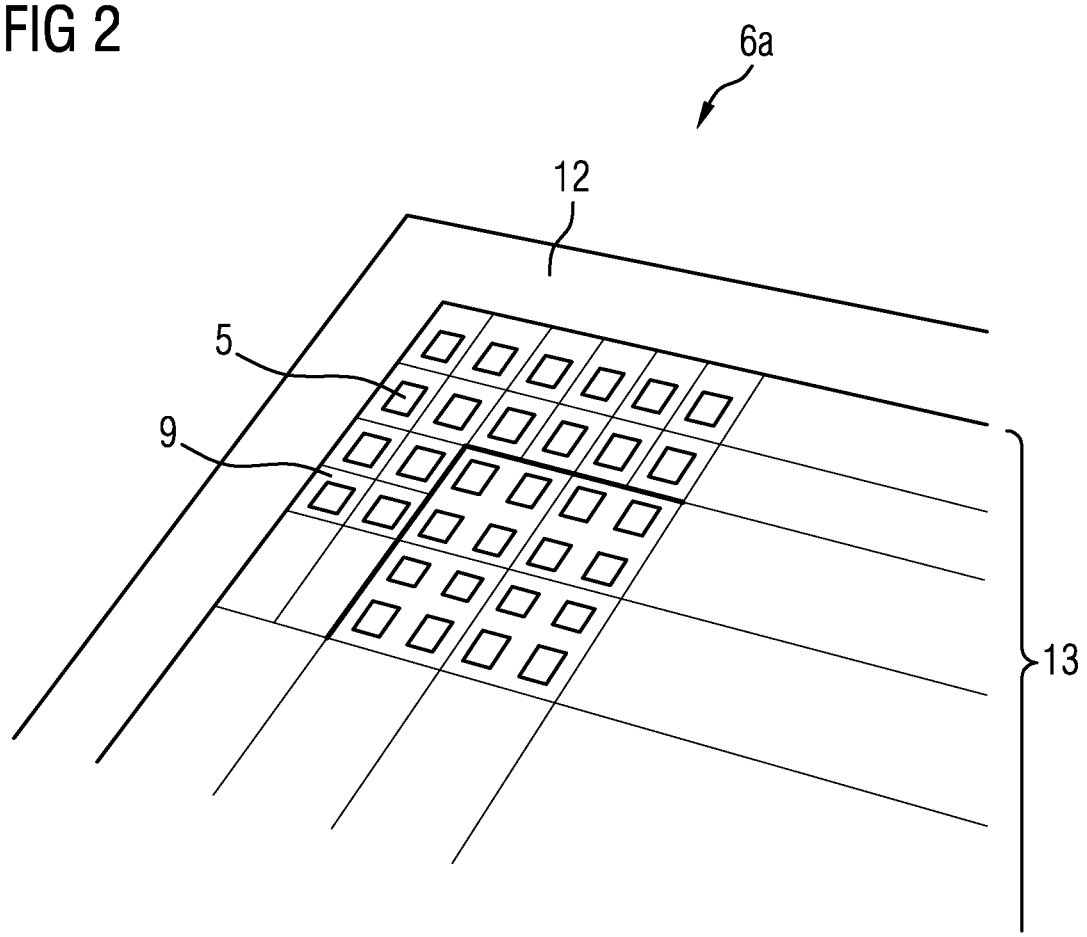
FIG. 2 shows a first configuration of a backlighting module.

Furthermore, provision is made of a transition edge region 9 (FIG. 2) extending from the backlighting edge 12 (FIG. 2) over a portion of the backlighting inner surface 13 (FIG. 2). Said transition edge region comprises a first number of driveable LEDs 5.

At the backlighting inner surface without the transition edge region 9 (FIG. 2), by contrast, a second number of individually driveable LEDs 5 are arranged. In this case, the first number is higher than the second number. The contrast of the image representation is increased as a result.

Furthermore, alternatively or optionally supplementarily, the LEDs 5 arranged in the transition edge region 9 (FIG. 2) can be interconnected in first clusters or be driven individually, and those LEDs 5 which are arranged in the backlighting inner surface without the transition edge region 9 (FIG. 2) can be interconnected in second clusters, wherein the number of interconnected LEDs 5 in the first clusters is lower than the number of interconnected LEDs 5 in the second clusters.

Moreover, no or only a reduced number of LEDs 5 can be arranged in the backlighting edge 12 (FIG. 2) or in the regions of the backlighting inner surface 13 (FIG. 2) that correspond to the non-visible regions. The local dimming algorithms are adapted according to the modified number of LEDs 5.

The higher resolution in the transition edge region 9 (FIG. 2) enables very local backlighting of details on the display inner surface. As a result, adjacent dark regions, for example the display edge region or regions in which an operating element is arranged, are illuminated less, as a result of which the local contrast increases. This has the effect that the active display inner surface differs less from the black print of the liquid crystal display 2. As a result of the reduction and/or even the omission of the LEDs 5 at the backlighting module 6, system costs are saved.

The transition between the active display inner surface of the liquid crystal display 2 and the black regions of the display is optimized to the effect that the difference is indiscernible to the driver. In other words, in particular, the background brightness of black image regions in the liquid crystal display 2 is minimized.

FIG. 2 shows a detailed configuration of a backlighting module 6a according to the disclosure.

The backlighting module 6a comprises a backlighting edge 12 and a backlighting inner surface 13.

In addition, the backlighting module 6a comprises a transition edge region 9 extending from the backlighting edge 12 over a portion of the backlighting inner surface 13.

Furthermore, the backlighting module 6a comprises LEDs 5 for illuminating the liquid crystal display 2.

The backlighting module 6a has no LEDs 5 at the backlighting edge 12. Furthermore, the LEDs 5 arranged in the transition edge region 9 are controlled individually by the control system (not shown). The LEDs 5 arranged in/on the backlighting inner surface 13 without the transition edge region 9 are controlled in clusters, here in groups of four.

While the LEDs 5 in the majority of the backlighting inner surface 13 are therefore interconnected in larger groups, the LEDs 5 in the transition edge region 9 are driven in smaller groups or individually.

A local higher resolution is achieved as a result. Overexposure of black regions such as the display edge, for example, is prevented.

Figure 3:
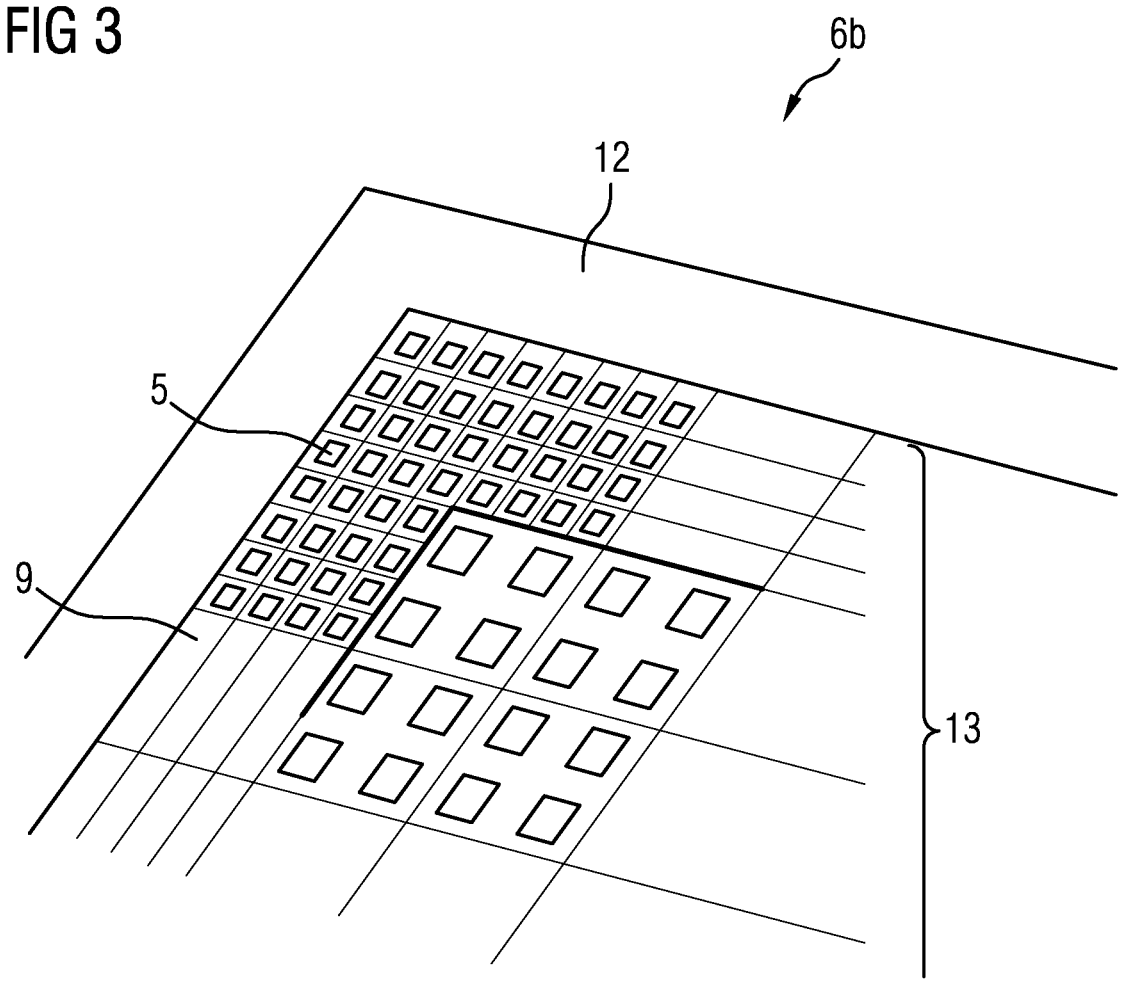
FIG. 3 shows a second configuration of a backlighting module.

FIG. 3 shows a further detailed configuration of a backlighting module 6b according to the invention. This backlighting module 6b comprises the backlighting edge 12 and the backlighting inner surface 13.

In addition, the backlighting module 6b comprises the transition edge region 9 extending once again from the backlighting edge 12 over a portion of the backlighting inner surface 13.

Furthermore, the backlighting module 6b comprises LEDs 5.

The backlighting module 6b likewise has no LEDs 5 at the backlighting edge 12. Furthermore, the LEDs 5 arranged in the transition edge region 9 are controlled individually by the control system (not shown). The LEDs 5 arranged in/on the backlighting inner surface 13 without the transition edge region 9 are controlled in clusters, here in groups of four.

In addition, a first number of individually driveable LEDs 5 are arranged in the transition edge region 9; by contrast, a second number of individually driveable luminous units are arranged at the backlighting inner surface 13 without the transition edge region 9.

In this case, the first number is higher than the second number.

The resolution of the backlighting module 6b is increased in the transition edge region 9 of the liquid crystal display 2 (FIG. 1) by the addition of the additional LEDs 5 and by individual driving of the LEDs 5. The local dimming algorithms are adapted according to the modified density. In regions which are not visible, such as here the backlighting edge 12, the LEDs 5 are omitted and system costs are thus saved.

The display system 1 (FIG. 1) according to the disclosure is usable in all fields in which a display is used, for example in fields of consumer electronics, in aviation, in trains, in medical technology.

The invention claimed is:

1. A display system, comprising:
   a display configured for displaying data, wherein the display comprises an inactive display edge not configured for displaying, and an active display inner surface configured for displaying;
   a backlighting module having luminous units, wherein the backlighting module is arranged directly or indirectly at a rear side of the display, such that the light emitted by the luminous units forms a backlight for the display, wherein the backlighting module comprises a backlighting edge corresponding to the display edge and a backlighting inner surface corresponding to the display inner surface, wherein a transition edge region extends from the backlighting edge over a portion of the backlighting inner surface, wherein a first number of individually drivable luminous units are arranged in the transition edge region, wherein the backlighting inner surface without the transition edge region comprises a second number of individually drivable luminous units, and wherein the first number is higher than the second number; and
   a control system for driving the luminous units.

2. The display system according to claim 1, wherein the control system is configured to drive the luminous units arranged in the transition edge region individually or with said luminous units interconnected in first clusters, and to drive the luminous units comprised by the backlighting inner surface without the transition edge region with said luminous units interconnected in second clusters, wherein the number of interconnected luminous units in the first cluster is lower than the number of interconnected luminous units in the second cluster.

3. The display system according to claim 1, wherein the display is configured as a liquid crystal display.

4. The display system according to claim 1, wherein the luminous units in the transition edge region are arranged in a matrix-shaped fashion.

5. The display system according to claim 1, wherein the luminous units in the backlighting inner surface without the transition edge region are arranged in a matrix-shaped fashion.

6. The display system according to claim 2, wherein no luminous units, or in comparison with the transition edge region and the backlighting inner surface without the transition edge region, a reduced number of luminous units are arranged in the backlighting edge.

7. The display system according to claim 2, wherein the display inner surface comprises non-visible regions and no luminous units are arranged in the backlighting inner surface corresponding to said regions.

8. The display system according to claim 2, wherein the display inner surface comprises non-visible regions and a reduced number of luminous units are arranged in the backlighting inner surface corresponding to said regions.

9. The display system according to claim 2, wherein the luminous units are configured as light emitting diodes.

10. The display system as claimed in claim 9, wherein the light emitting diodes are designed to be individually dimmable.

11. A vehicle, comprising:
    a display system, comprising:
       a display configured for displaying data, wherein the display comprises an inactive display edge not configured for displaying, and an active display inner surface configured for displaying;
       a backlighting module having luminous units, wherein the backlighting module is arranged directly or indirectly at a rear side of the display, such that the light emitted by the luminous units forms a backlight for the display, wherein the backlighting module comprises a backlighting edge corresponding to the display edge and a backlighting inner surface corresponding to the display inner surface, wherein a transition edge portion extends from the backlighting edge over a portion of the backlighting inner surface, wherein a first number of individually drivable luminous units are arranged in the transition edge region, wherein the backlighting inner surface without the transition edge region comprises a second number of individually drivable luminous units, and wherein the first number is higher than the second number; and
       a control system for driving the luminous units.

12. The display system according to claim 11, wherein the control system is configured to drive the luminous units arranged in the transition edge region individually or with said luminous units interconnected in first clusters, and to drive the luminous units comprised by the backlighting inner surface without the transition edge region with said luminous units interconnected in second clusters, wherein the number of interconnected luminous units in the first cluster is lower than the number of interconnected luminous units in the second cluster.

13. A method for operating a display system, comprising:
    providing a display configured for displaying data, wherein the display comprises an inactive display edge not configured for displaying, and an active display inner surface configured for displaying;
    providing a backlighting module having luminous units, wherein the backlighting module is arranged directly or indirectly at a rear side of the display, such that the light emitted by the luminous units forms a backlight for the display, and wherein the backlighting module comprises a backlighting edge corresponding to the display edge and comprises a backlighting inner surface corresponding to the display inner surface;
    providing a control system for driving the luminous units;
    providing a transition edge region extending from the backlighting edge over a portion of the backlighting inner surface;

operating a first number of individually driveable luminous units arranged in the transition edge region; and operating a second number of individually driveable luminous units arranged in the backlighting inner surface-without the transition edge region, wherein the first number is higher than the second number.

14. The method according to claim 13, wherein the method further comprises driving luminous units individually or with said luminous units interconnected in first clusters, which are arranged in the transition edge region, and interconnected in second clusters, which are arranged in the backlighting inner surface without the transition edge region, wherein the number of interconnected luminous units in the first cluster is lower than the number of interconnected luminous units in the second cluster.

15. The method according to claim 14, wherein no luminous units or, in comparison with the transition edge region and the backlighting inner surface without the transition edge region, a reduced number of luminous units are arranged in the backlighting edge.

* * * * *